US010317815B2

(12) United States Patent
Saiki

(10) Patent No.: US 10,317,815 B2
(45) Date of Patent: Jun. 11, 2019

(54) IMAGE FORMING APPARATUS, METHOD FOR MANAGING CONSUMABLE, AND STORAGE MEDIUM

(71) Applicant: CANON KABUSHIKI KAISHA, Tokyo (JP)

(72) Inventor: Kenji Saiki, Moriya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/261,516

(22) Filed: Sep. 9, 2016

(65) Prior Publication Data

US 2017/0075270 A1 Mar. 16, 2017

(30) Foreign Application Priority Data

Sep. 15, 2015 (JP) ................................ 2015-181578

(51) Int. Cl.

*G03G 15/08* (2006.01)
*G03G 21/00* (2006.01)
*H04N 1/00* (2006.01)
*B41J 29/38* (2006.01)
*G03G 15/00* (2006.01)

(52) U.S. Cl.

CPC ....... *G03G 15/0863* (2013.01); *G03G 15/502* (2013.01); *G03G 15/55* (2013.01); *G03G 15/5016* (2013.01); *G03G 2215/0132* (2013.01)

(58) Field of Classification Search

CPC ............... G03G 15/553; G03G 15/556; G03G 15/0831; G03G 15/50; G03G 15/0863
See application file for complete search history.

(56) References Cited

U.S. PATENT DOCUMENTS

2003/0228163 A1* 12/2003 Yokoi ................ G03G 15/5079 399/27
2008/0240745 A1* 10/2008 Hibino ................ G03G 15/553 399/24

FOREIGN PATENT DOCUMENTS

JP 2008-250087 A 10/2008

* cited by examiner

*Primary Examiner* — David M. Gray
*Assistant Examiner* — Michael A Harrison
(74) *Attorney, Agent, or Firm* — Canon USA Inc., IP Division

(57) ABSTRACT

An image forming apparatus is provided which can properly manage individual information after replacement and history of replacement on the apparatus side. If individual information is successfully read from a toner cartridge storing the individual information, the image forming apparatus records the individual information in an apparatus-side memory. At a predetermined timing of when there is a possibility that the toner cartridge is replaced, the image forming apparatus attempts to read information from the toner cartridge. If the reading fails and the individual information recorded in the apparatus-side storage is not information read from the toner cartridge, the image forming apparatus writes new individual information about the toner cartridge to the apparatus-side storage, and records information generated on the apparatus side in the written individual information.

11 Claims, 9 Drawing Sheets

FIG.4

| | | |
|---|---|---|
| SERIAL NUMBER | 1111 | 401 |
| TYPE | NORMAL | 402 |
| NUMBER OF PRINTED SHEETS | 000000 | 403 |
| REMAINING AMOUNT | 100 | 404 |

FIG.5

| No. | SERIAL NUMBER (501) | TYPE (502) | REMAINING AMOUNT (503) | INITIAL NUMBER OF PRINTED SHEETS (504) | FINAL NUMBER OF PRINTED SHEETS (505) | DATE AND TIME OF INITIAL USE (506) | DATE AND TIME OF LAST USE (507) |
|---|---|---|---|---|---|---|---|
| 01 | 1111 | NORMAL | 1% | 00000 | 50000 | 15/06/01 12:00 | 15/07/05 17:00 |
| 02 | 2222 | HIGH CAPACITY | 30% | 10000 | 70000 | 15/07/05 17:40 | 15/08/30 10:00 |
| 03 | 3333 | UNKNOWN | 50% | 05000 | 05100 | 15/08/30 10:05 | 15/08/30 11:00 |
| 04 | UNKNOWN | NO TAG | 20% | 00000 | 02000 | 15/08/30 11:30 | 15/08/30 13:00 |
| 05 | 1111 | NORMAL | 0% | 50000 | 50300 | 15/09/01 09:00 | 15/09/02 19:00 |

| SERIAL NUMBER | TYPE | DATE AND TIME OF START OF USE | PAGE COUNT | DATE AND TIME OF LAST USE | PAGE COUNT | REMAINING AMOUNT |
|---|---|---|---|---|---|---|
| 1111 | NORMAL | 2015/06/01 12:00 | 000000 | 2015/07/05 17:00 | 050000 | 001% |
| 2222 | HIGH CAPACITY | 2015/07/05 17:40 | 010000 | 2015/08/30 10:00 | 070000 | 030% |
| 3333 | UNKNOWN | 2015/08/30 10:05 | 005000 | 2015/08/30 11:00 | 005100 | 050% |
| UNKNOWN | NO TAG | 2015/08/30 11:30 | 000000 | 2015/08/30 13:00 | 002000 | 020% |
| 1111 | NORMAL | 2015/09/01 09:00 | 050000 | 2015/09/02 19:00 | 050300 | 000% |

IMAGE FORMING APPARATUS, METHOD FOR MANAGING CONSUMABLE, AND STORAGE MEDIUM

BACKGROUND OF THE INVENTION

Field of the Invention

The present invention relates to an image forming apparatus which properly manages a use record and history of replacement about a consumable, such as a toner cartridge.

Description of the Related Art

Recent image forming apparatuses typically use a cartridge into which toner, a photosensitive drum, and a developing unit are integrated, as a replaceable consumable. Some cartridges are equipped with a storage medium, such as a memory tag. Each time the filled toner is consumed, a use record including the number of print media on which images are formed and the amount of toner consumed in each time is recorded in the memory tag. In such a cartridge, information indicating the total amount of toner consumed so far is recorded in the memory tag. This provides an advantage that the remaining amount of toner can be accurately estimated even if the cartridge is mounted on another image forming apparatus.

Nowadays identifiers and use records of cartridges may be stored in a memory on the main body side of the image forming apparatus when the cartridges are mounted or replaced. For example, Japanese Patent Application Laid-Open No. 2008-250087 discusses an image forming apparatus which reads life information changing according to the use of a consumable from a memory tag included in a cartridge, and stores the life information in a memory on the apparatus main body side.

Aside from ones provided by the manufacturer of the image forming apparatus, cartridges provided by other than the manufacturer of the image forming apparatus may be mounted on the image forming apparatus. The toner filled in the latter cartridges does not always have the same characteristic as that of toner contained in the former cartridges. Some users consider it a print defect that color developability or color reproducibility varies before and after the replacement of a cartridge, and troubles can occur. As a measure for analyzing causes at the occurrence of such troubles, individual information unique to a cartridge, such as a cartridge identifier, is stored in the memory tag, and the stored individual information is read and recorded on the apparatus main body side. However, there is a problem that if the memory tag on the cartridge side becomes inaccessible for any reason (a failure or non-mounting), the individual information about the cartridge is unable to be recorded in the apparatus main body.

Such a problem occurs commonly in apparatuses that perform image formation using consumables that store individual information, being not limited to cartridges.

SUMMARY OF THE INVENTION

Aspects of the present invention are directed to providing an image forming apparatus which, even if individual information about a consumable is not able to be read, properly manages individual information about a replacing consumable on the apparatus side when the consumable is replaced.

According to an aspect of the present invention, an image forming apparatus for performing image formation using a consumable container comprising a memory configured to store individual information unique to the consumable container, the image forming apparatus includes at least one processor and at least one memory coupled to the at least one processor that stores instructions and, upon execution of the instructions by the at least one processor controls the at least one processor to act as a reading unit configured to read the individual information from the memory of the consumable container, a storage control unit configured to record the individual information in a storage of the image forming apparatus, and a control unit configured to write, in response to the reading unit failing to read the individual information from the memory of the consumable container, new individual information about the consumable container to the storage of the image forming apparatus.

Further features will become apparent from the following description of exemplary embodiments with reference to the attached drawings.

BRIEF DESCRIPTION OF THE DRAWINGS

FIG. 4 is a diagram illustrating mounted cartridge information stored in a memory tag.

FIG. 5 is a diagram illustrating a cartridge replacement log.

DESCRIPTION OF THE EMBODIMENTS

Figure 1:
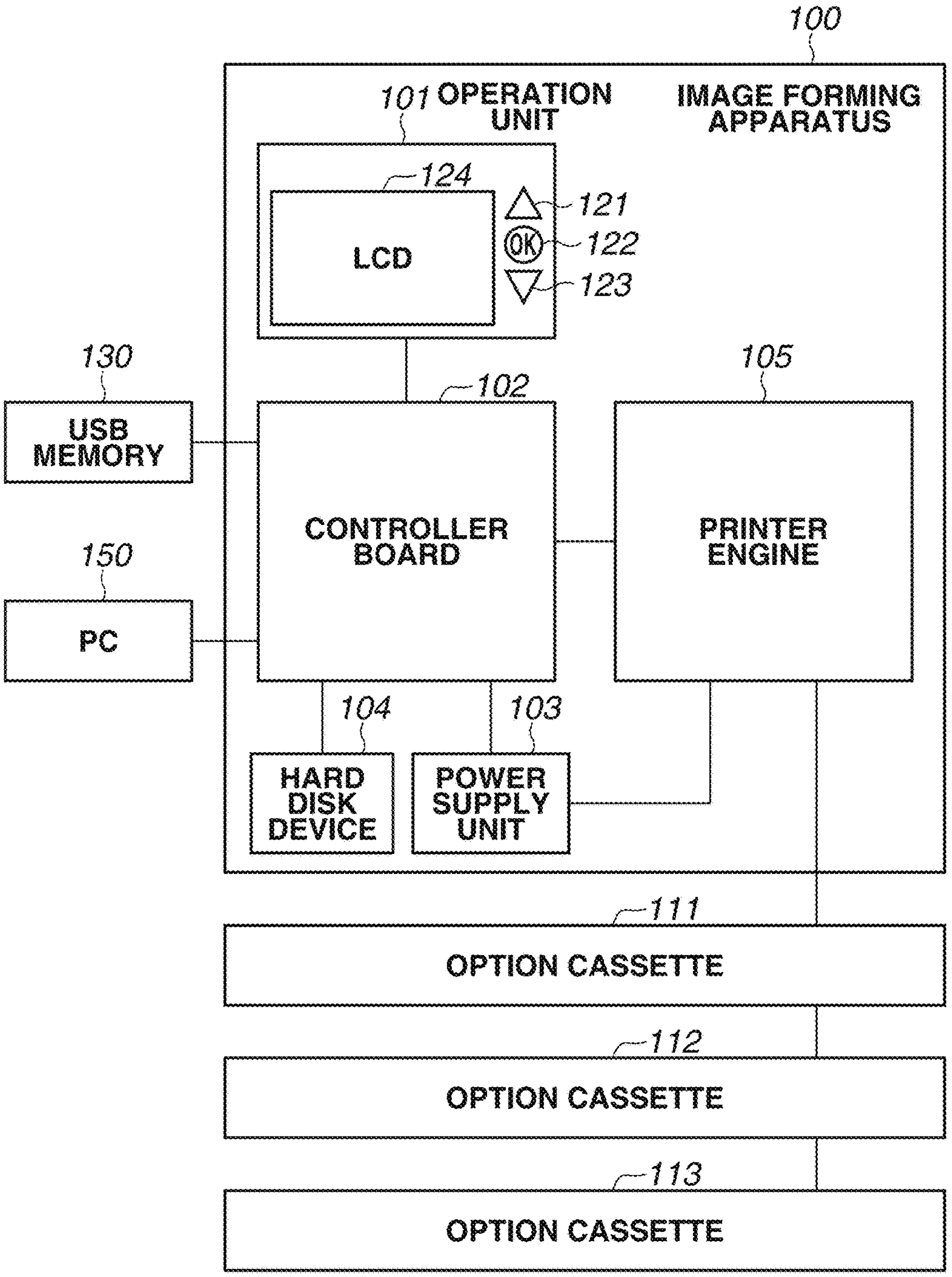
FIG. 1 is a schematic configuration diagram illustrating an image forming apparatus.

FIG. 1 is a schematic configuration diagram of an image forming apparatus according to the present exemplary embodiment. An image forming apparatus 100 includes an operation unit 101, a controller board 102, a power supply unit 103, a hard disk device 104, and a printer engine 105. Option cassettes 111, 112, and 113 for increasing the supply amount of sheets are connected to the image forming apparatus 100. The controller board 102 includes an interface for enabling connection with a Universal Serial Bus (USB) memory 130 and a personal computer (PC) 150. The PC 150 is an external apparatus that issues an image formation instruction to the image forming apparatus 100. The PC 150 and the controller board 102 may be directly connected via a communication cable. Alternatively, the PC 150 and the controller board 102 may be indirectly connected via a network hub, the Internet, an intranet, or the like. The controller board 102 and the PC 150 may be connected in a wired or wireless manner.

An application (hereinafter, referred to as "AP") for causing the image forming apparatus 100 to form an image is installed on the PC 150. The AP transmits print settings, such as a sheet size and a sheet type, and commands for drawing graphics and text to a printer driver. The printer driver is a print control program, and runs on the PC 150 with the AP. The printer driver generates a print job based on the print settings and drawing commands, and issues the print job to the controller board 102.

The controller board 102 functions as a control unit for controlling an operation of the entire image forming apparatus 100. The operation unit 101 is an interface module for accepting user's instructions and notifying the user of a state of the image forming apparatus 100. The operation unit 101 includes an up button 121, an execution button 122, and a down button 123 for accepting the instructions from the user, and a display panel (liquid crystal display (LCD)) 124 for notifying the user of the state of the image forming apparatus 100. The display panel 124 includes an LCD on which a touch sensor is arranged. The up button 121 and the down button 123 are operation buttons for changing a selection item designated by a cursor on the display panel 124. The execution button 122 is an operation button for executing the selection item designated by the cursor. If the execution button 122 is pressed with the cursor on a selection item B on the display panel 124, a function associated with the selection item B is executed.

The operation unit 101 illustrated in FIG. 1 is just an example, and may include other input units and output units. For example, a unit for accepting operation instructions by a voice input may be included. An operation result may be pronounced by speech synthesis. A buzzer may be used to issue an alarm. The operation unit 101 may have an arbitrary configuration in carrying out an exemplary embodiment of the present invention.

The hard disk device 104 is a storage module in which various programs are installed. The hard disk device 104 temporarily stores a print job and the like received by the controller board 102 from the PC 150. The hard disk device 104 also temporarily stores a print image rendered based on the print job before the printer engine 105 prints the print image. The hard disk device 104 may be implemented by a semiconductor storage, such as a solid state drive (SSD). The power supply unit 103 is a unit for supplying power to the controller board 102 and the printer engine 105.

The printer engine 105 is a print mechanism which feeds a print sheet from an output sheet feed stage according to the print settings instructed by the controller board 102, and prints the print image supplied from the controller board 102 on the print sheet. Each of the option cassettes 111, 112, and 113 is a feed stage module additionally mounted on the apparatus main body and operates integrally with the printer engine 105. The USB memory 130 is a storage device that can store a print job. In the present exemplary embodiment, a print job is stored in the USB memory 130. Print processing of the print job is performed when a print instruction is issued from the operation unit 101.

In the example of FIG. 1, the controller board 102 and the printer engine 105 are provided in the same housing. The controller board 102 and the printer engine 105 may be configured in separate housings. In other words, the image forming apparatus 100 may be configured to be implemented as an image forming system including a printer server. In such a case, part of the functions of the controller board 102 may be provided by a server on a cloud service. The PC 150 may be in charge of the functions corresponding to the controller board 102, and the image forming apparatus 100 may be configured to be specialized in the control of the printer engine 105. Such a configuration is called a host-based print system.

Figure 2:
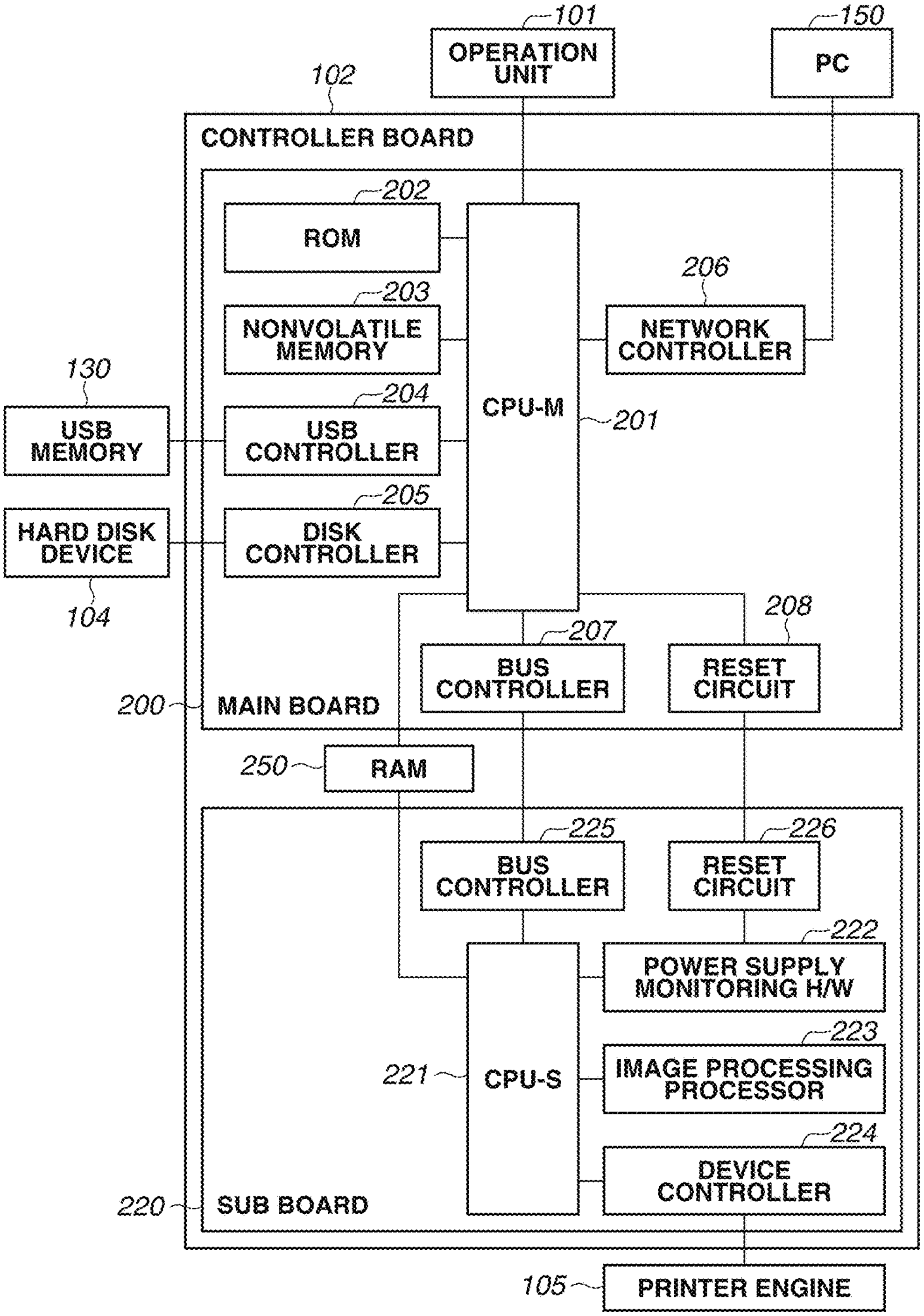
FIG. 2 is a block configuration diagram illustrating a controller board.

Next, the controller board 102 according to the present exemplary embodiment will be described in detail. FIG. 2 is a block configuration diagram of the controller board 102. The controller board 102 includes a main board 200 and a sub board 220. Though omitted in FIG. 2, peripheral devices, such as a chip set, a bus bridge, and a clock generator, are also mounted on the controller board 102. The main board 200 includes a central processing unit (CPU)-M 201, a read only memory (ROM) 202, and a nonvolatile memory 203, which constitute a computer. The main board 200 further includes a USB controller 204, a disk controller 205, a network controller 206, a bus controller 207, and a reset circuit 208. The CPU-M 201 is a central processing unit for controlling the modules included in the main board 200. The ROM 202 is a storage module for storing an initial program of the CPU-M 201. The initial program is a program that is read by the CPU-M 201 immediately after the image forming apparatus 100 is powered on. The initial program includes a command needed to read a main program from the hard disk device 104.

The nonvolatile memory 203 is a storage module for recording setting information about the image forming apparatus 100 and individual information unique to each toner cartridge that is a consumable container to be described below. In the following description, in contrast to information storage units on the toner cartridge side, the nonvolatile memory 203 will be referred to as an "apparatus-side memory." The apparatus-side memory 203 stores information even if the image forming apparatus 100 is powered off. If the image forming apparatus 100 is powered on again, the values before the power-off can be referred to. The apparatus-side memory 203 may be a nonvolatile storage such as Hard Disk Drive (HDD). The USB controller 204 is a control module for controlling communication between the image forming apparatus 100 and USB devices. In the present exemplary embodiment, the USB controller 204 controls data input and output from/to the USB memory 130 described above. In another mode, the PC 150 and the image forming apparatus 100 may be connected by a USB cable. In such a mode, the image forming apparatus 100 controls input and output using the USB controller 204 and operates as a peripheral device of the PC 150.

The disk controller 205 is a control module for inputting and outputting data from/to the hard disk device 104. The network controller 206 is a control module for inputting and outputting data from/to the PC 150 via a network cable or a wireless communication path. The bus controller 207 is a module having a bridge function with a bus controller 225 of the sub board 220. The reset circuit 208 is a control module for resetting not-illustrated various pieces of hardware (H/W) of the main board 200 to an initial state.

The sub board 220 includes a CPU-S 221, a power supply monitoring H/W 222, an image processing processor 223, a device controller 224, the bus controller 225, and a reset circuit 226. The CPU-S 221 is a central processing unit for controlling the modules included in the sub board 220. The power supply monitoring H/W 222 is a module for monitoring a power supply control state. If the CPU-S 221 is able to operate normally, the power supply monitoring H/W 222 can reset the entire image forming apparatus 100 via the reset circuit 226 and the reset circuit 208 according to an instruction from the CPU-S 221. If no power is supplied to the CPU-S 221, the power supply monitoring H/W 222 can power on the controller board 102 according to an input from a not-illustrated power switch. The power supply monitoring H/W 222 may be implemented by a small-scale system running on another CPU. The reset circuit 226 is a control module for resetting the H/W of the sub board 220 to an initial state.

The image processing processor 223 is a module for performing digital image processing in real time. For example, the image processing processor 223 performs image processing for converting intermediate data (display list) obtained by a print job data analysis unit analyzing print job data into a contone image. The image processing processor 223 also performs image processing for generating a print image expressed in halftones that can be output by the printer engine 105, based on the contone image. Such image processing is referred to as dithering processing. The image processing processor 223 also performs processing for sorting print images in plane order. The image processing processor 223 further performs image processing for adjusting a contone image to user-desired color tones. Such an image processing processor 223 can be implemented by an application specific integrated circuit (ASIC). Alternatively, the image processing processor 223 may be implemented by a field-programmable gate array (FPGA). The present exemplary embodiment will be described on the assumption that the image processing processor 223 performs the digital image processing in real time. However, the real-time digital image processing may be performed by cooperation of the image processing processor 223 and the CPU-M 201 or the CPU-S 221.

The device controller 224 is a module for controlling the printer engine 105. The bus controller 225 is a module having a bridge function with the bus controller 207 of the main board 200. The CPU-M 201 and the CPU-S 221 can share and transmit various types of information via the bus controllers 207 and 225. A random access memory (RAM) 250 is a main storage memory module accessible to both the CPU-M 201 and the CPU-S 221.

When the image forming apparatus 100 is powered on, the CPU-M 201 of the controller board 102 reads the initial program of the ROM 202 into the RAM 205. The CPU-M 201 then activates the initial program on the RAM 250. A computer program (main program) intended for the CPU-M 201 and the CPU-S 221, stored in the hard disk device 104, is thereby stored into the RAM 250. The CPU-M 201 and the CPU-S 221 execute the main program to implement the functions of the image forming apparatus 100. The RAM 250 is also used as a temporary work memory in executing the initial program and the main program. While the present exemplary embodiment is described based on a mode in which the CPU-M 201 and the CPU-S 221 share the RAM 250, the CPU-M 201 and the CPU-S 221 may be provided with respective dedicated RAMS.

In the present exemplary embodiment, the apparatus-side memory 203, the USB controller 204, the disk controller 205, and the network controller 206 are provided on the main board 200 side. However, the configuration is not limited thereto. Some of the modules may be provided on the sub board 220 side. All the functions of the sub board 220 may be implemented on the main board 200, and the CPU-M 201 may be configured to implement the functions which are implemented on the sub board 220 instead of the CPU-S 221.

Figure 3A:
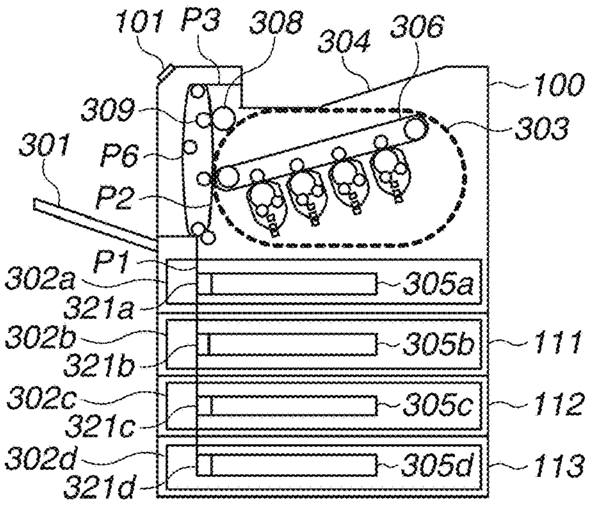
FIGS. 3A, 3B, and 3C are schematic diagrams illustrating a configuration example of the image forming apparatus.
Figure 3B:
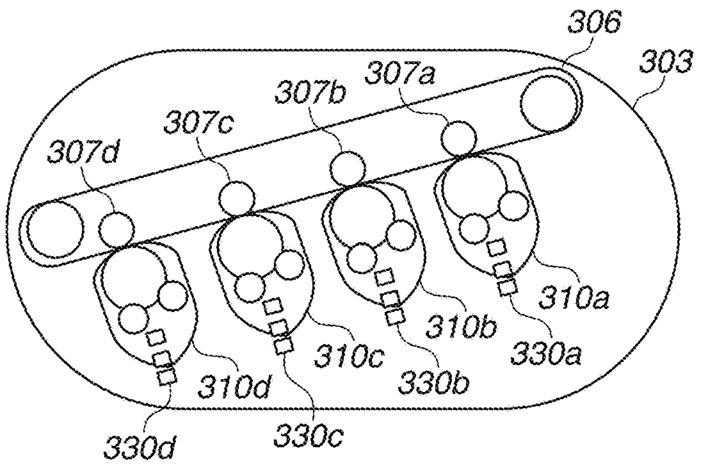
Figure 3C:
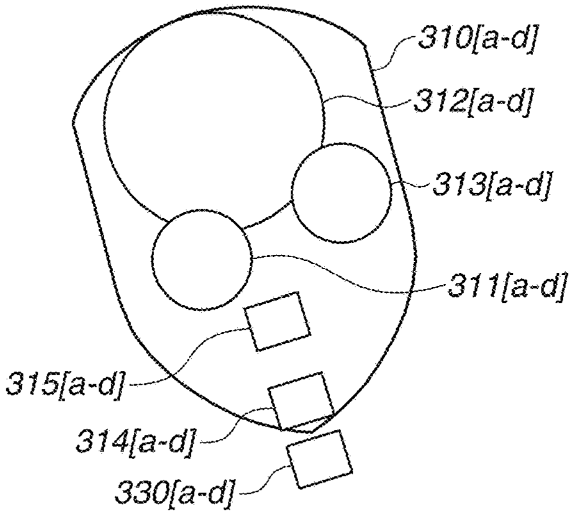

FIGS. 3A to 3C are schematic diagrams illustrating a physical configuration of the image forming apparatus 100. FIG. 3A is a sectional view illustrating an overall configuration. FIG. 3B is a partial enlarged view of an image forming unit. FIG. 3C is an enlarged view of FIG. 3B. In the example illustrated in FIGS. 3A to 3C, the image forming apparatus 100 is described to be capable of color printing using four color toners of yellow, magenta, cyan, and black. However, this example is not restrictive. The image forming apparatus 100 may be configured to form an image by monochrome printing in one color of the black toner. The image forming apparatus 100 may be configured to use more color toners. The image forming apparatus 100 may be configured to be able to express various textures on the surface of the print product by using a clear toner as well.

Referring to FIG. 3A, the image forming apparatus 100 includes a feed tray 301, a feed cassette 302*a*, and a discharge tray 304. The option cassettes 111 to 113 are accompanied with respective corresponding feed cassettes 302*b* to 302*d*. The feed cassettes 302*a* to 302*d* store print sheets 305*a* to 305*d*. The four feed cassettes 302*a* to 302*d* have the same mechanism. The image forming apparatus 100 includes an image forming unit 303 and a fixing device unit. In FIG. 3A, the image forming unit 303 is illustrated by a broken line. FIG. 3B illustrates a partial enlarged view of the image forming unit 303. The image forming unit 303 forms an image of toner on a print sheet by an electrophotographic process. The fixing device unit includes a fixing roller 308 and a pressure roller 309, and fixes the toner on the print sheet. For one-sided printing, a sheet fed from the feed cassettes 302*a* to 302*d* is conveyed through paths P1, P2, and P3 in order. For two-sided printing, a sheet is conveyed through the paths P1, P2, and P3 in order, switched back after passing the path P3, conveyed through paths P6, P2, and P3 in order, and discharged out of the image forming apparatus 100.

Referring to FIG. 3B, four toner cartridges 310*a* to 310*d* that are consumable containers used for image formation are replaceably mounted on the image forming unit 303. The toner cartridge 310*a* is a yellow toner cartridge. The toner cartridge 310*b* is a magenta toner cartridge. The toner cartridge 310*c* is a cyan toner cartridge. The toner cartridge 310*d* is a black toner cartridge. The toner cartridges 310*a* to 310*d* are opposed to transfer rollers 307*a* to 307*d*, respectively, with an intermediate transfer belt 306 therebetween. The image forming unit 303 includes memory tag interfaces 330*a* to 330*d* for communicating with memory tags 314*a* to 314*d* to be described below. More specifically, the memory tag interfaces 330*a* to 330*d* function as reading units for reading information stored in the memory tags 314*a* to 314*d*. The memory tag interfaces 330*a* to 330*d* also function as update units for updating the information stored in the memory tags 314*a* to 314*d*.

Referring to FIG. 3C, a configuration of the toner cartridges 310*a* to 310*d* will be described. The toner cartridge 310*a* will be described in a representative manner. A detailed description of the toner cartridges 310*b* to 310*d* of other colors will be omitted because there is no difference other than the channels of latent images of a print image. In FIG. 3C, only the reference numerals are so denoted by [a-d]. The toner cartridge 310*a* includes a charging unit including a charging roller 311*a*, a developing unit including a developing roller 312*a*, a photosensitive drum 313*a*, and the memory tag 314*a*. A toner remaining life sensor 315*a* is arranged in a predetermined position. The charging unit is a unit that forms a latent image of a print image of corresponding color transmitted from the foregoing controller board 102 on the photosensitive drum 313*a*. The developing unit is a unit that applies toner to the photosensitive drum 313*a* and develops the latent image, which is formed on the photosensitive drum 313*a*, of the print image of that color. The toner remaining life sensor 315*a* is a sensor that detects the remaining amount of toner.

The memory tag 314*a* is a noncontact integrated circuit (IC) tag which serves as an example of an information storage unit. Individual information unique to the toner cartridge 310*a* is recorded in the memory tag 314*a*. For the sake of convenience, such individual information will be referred to as "mounted cartridge information". FIG. 4 illustrates an example of the mounted cartridge information.

In the example of FIG. 4, a serial number 401, a type 402, the number of printed sheets 403, and a remaining amount 404 are recorded. The serial number 401 is identification information about the toner cartridge 310*a* (in the illustrated example, "1111"). The type 402 is information indicating specifications or a size of the toner cartridge 310*a* (in the illustrated example, "normal"). The number of printed sheets 403 is the total number of sheets printed using the toner cartridge 310*a* (in the illustrated example, "000000"). The remaining amount 404 indicates the remaining amount of toner in the toner cartridge 310*a* (in the illustrated example, "100"%). The remaining amount 404 is calculated from a detection value of the toner remaining life sensor 315*a* or a calculation value of the remaining amount to be described below.

A flash memory connected by serial connection and a microcomputer connectable by near field wireless communication may be used instead of the memory tag 314*a*. In such a case, the microcomputer receives a command and performs a write or read on the flash memory connected to the microcomputer. From the viewpoint of the printer engine 105, the toner cartridges 310*a* to 310*d* may appear to have separate interfaces for print control and for memory tag communication. Alternatively, the memory tags 314*a* to 314*d* may be configured to be capable of communicating via the interface for print control. In either case, an exemplary embodiment of the present invention is applicable.

Next, an outline of the operation of the printer engine 105 during printing will be described with reference to FIGS. 2 to 4. The printer engine 105 develops print images transmitted from the controller board 102 with a print instruction by using the photosensitive drums 313*a* to 313*d*, and primarily transfers the print images to the intermediate transfer belt 306 by the transfer rollers 307*a* to 307*d* in succession. The printer engine 105 feeds a print sheet from any one of the feed cassettes 302*a* to 302*d*, and secondarily transfers the toner primarily transferred to the intermediate transfer belt 306 to the print sheet being conveyed to the path P2 via the path P1. The printer engine 105 conveys the print sheet to the fixing unit, and fixes the toner to the surface of the print sheet. The printer engine 105 then discharges the toner-fixed print sheet to the discharge tray 304 via the path P3. The printer engine 105 detects the remaining amounts of print sheets stored in the feed cassettes 302*a* to 302*d* by using sheet remaining amount sensors 321*a* to 321*d*.

The controller board 102 controls the operation of the printer engine 105 and monitors an operation state of the printer engine 105. The controller board 102 calculates the consumed amounts in image formation, i.e., the toner consumption amount and the number of printed sheets, based on the print data, and thereby measures consumption degrees of the toner cartridges 310*a* to 310*d* (measurement unit). A consumption degree includes at least either one of the number of printed sheets and the remaining amount of toner based on the consumed amount of toner. The controller board 102 further detects replacement of the toner cartridges 310*a* to 310*d* (replacement detection unit). If the replacement of the toner cartridges 310*a* to 310*d* is detected, the controller board 102 generates a cartridge replacement log and additionally writes the cartridge replacement log to the apparatus-side memory 203. FIG. 5 illustrates an example of the cartridge replacement log generated by the controller board 102. This cartridge replacement log is an example of that of the yellow toner cartridge 310*a*. In the cartridge replacement log, one record is made (additionally written) for each toner cartridge. A record includes a serial number 501, a type 502, a remaining amount 503, the initial number of printed sheets 504, the final number of printed sheets 505, a date and time of start of use 506, and a date and time of last use 507. The serial number 501 is identification information about the toner cartridge. The type 502 is information indicating the type of the toner cartridge. In the present exemplary embodiment, there are four types "normal", "high capacity", "unknown", and "no tag" (non-mounting information). The type of "normal" represents a toner cartridge containing a typical amount of toner. The type of "high capacity" represents a toner cartridge containing a larger amount of toner than normal. The type of "unknown" represents a toner cartridge having an unexpected standard, neither normal nor high capacity. The type of "no tag" (non-mounting information) represents a fact that information has failed to be read from the memory tag 314*a* of the toner cartridge. The types are not limited to these four.

The remaining amount 503 is an index indicating the degree of consumption of the toner cartridge. The remaining amount 503 is updated as needed with a value calculated based on the amount of consumed toner during printing. The initial number of printed sheets 504 indicates the number of printed sheets when the toner cartridge is mounted. If the number of printed sheets 403 is successfully obtained from the memory tag 314*a*, the number is recorded. If the number of printed sheets 403 is not able to be obtained, zero is recorded. The final number of printed sheets 505 indicates the last number of printed sheets while the toner cartridge is mounted. The final number of printed sheets 505 is counted up during printing. The date and time of start of use (initial use) 506 is the date and time when the toner cartridge is first mounted. The date and time of last use 507 is the last date and time when the toner cartridge is mounted. In the present exemplary embodiment, the date and time of last use 507 refers to the date and time when the toner cartridge is last used for printing. The reason is that the date and time of replacement of a toner cartridge is not always easy to be detected if the toner cartridge is replaced when the image forming apparatus 100 is powered off. One of the characteristics of a method for managing a toner cartridge according to the present exemplary embodiment is that a new record is added to the cartridge replacement log illustrated in FIG. 5 if the replacement of the toner cartridge is detected. In the example of FIG. 5, five records Nos. 01 to 05 have been added to the cartridge replacement log. In other words, the cartridge replacement log shows history of five replacements. While only the cartridge replacement log of the yellow toner cartridge 310*a* is illustrated in the diagram, the other color toner cartridges 310*b* to 310*d* (magenta, cyan, and black) have similar cartridge replacement logs.

The replacement of a toner cartridge is detected before the toner cartridge is used for image formation. More specifically, the controller board 102 executes processing for recording individual information in the apparatus-side memory 203. The controller board 102 then reads individual information from the memory tag of the toner cartridge. If the reading fails and the individual information recorded in the apparatus-side memory 203 is not information read from the toner cartridge, the controller board 102 executes processing for additionally writing a new record to the apparatus-side memory 203.

Figure 6:
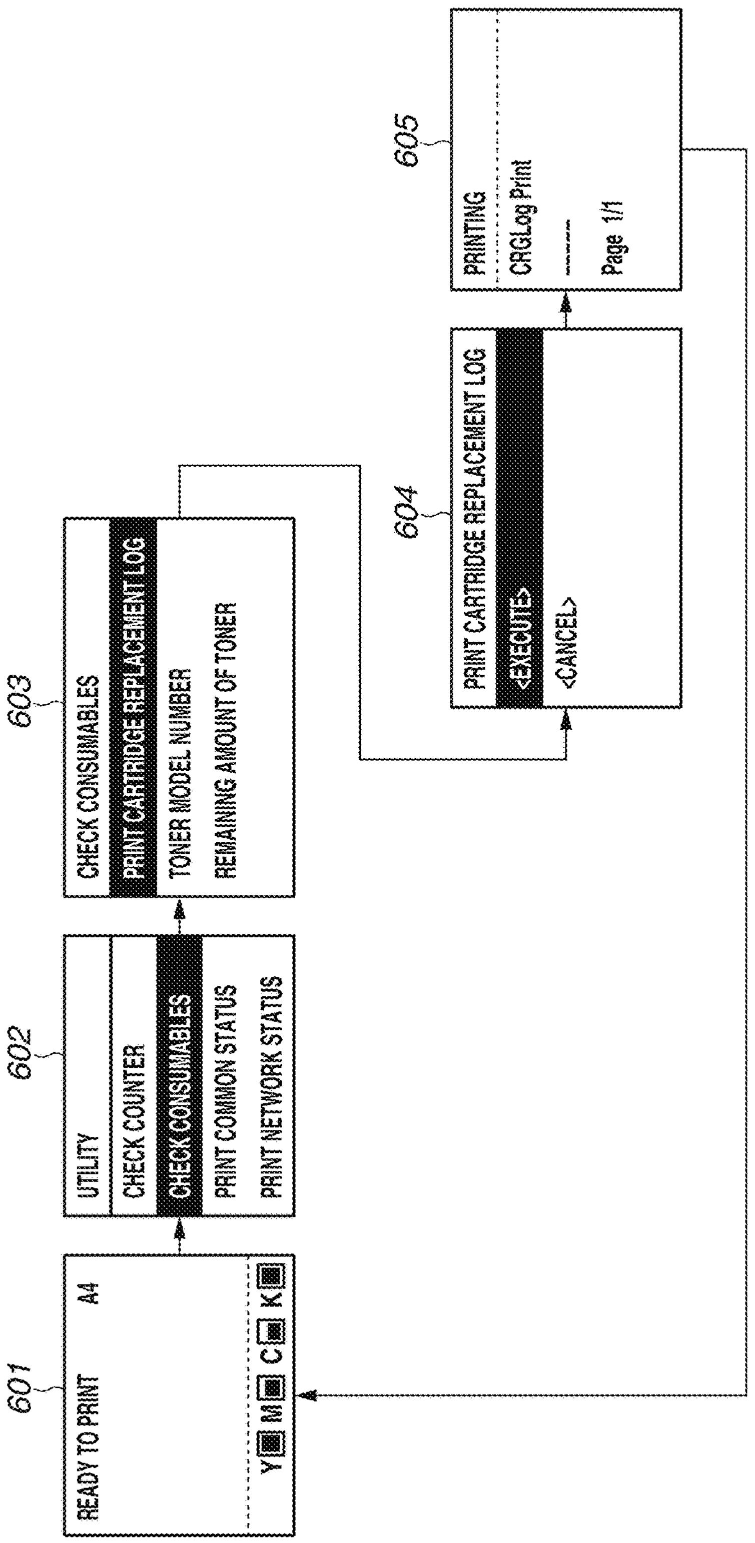
FIG. 6 is an explanatory diagram illustrating screen transitions by a report print function.

The cartridge replacement log can be output in a predetermined layout and checked when needed. Such a function is referred to as a report print function. The controller board 102 accepts a user operation on a screen of the operation unit 101, and executes the report print function. FIG. 6 is an explanatory diagram of screen transitions by the report print function. When the image forming apparatus 100 is activated, the screen of the operation unit 101 transitions to a job wait screen 601. If the down button 123 is detected to be pressed by the user during the display of the job wait screen 601, the screen transitions to a utility screen 602. When the utility screen 602 is initially displayed, a line "CHECK COUNTER" is focused on (inversely displayed or highlighted). If the down button 123 is detected to be pressed in such a state, the controller board 102 focuses on the next line "CHECK CONSUMABLES." If the execution button 122 is detected to be pressed here, the screen of the operation unit 101 transitions to a consumable check screen 603. In the consumable check screen 603, a line "PRINT CARTRIDGE REPLACEMENT LOG" is focused on. If the execution button 122 is detected to be pressed, the screen of the operation unit 101 transitions to a cartridge replacement log print screen 604. When the cartridge replacement log print screen 604 is initially displayed, a line "<EXECUTE>" is focused on. If the execution button 122 is detected to be pressed in such a state, the printing of the cartridge replacement log is executed. During the printing, a printing screen 605 is displayed on the screen of the operation unit 101. The screen returns to the job wait screen 601 at a timing in which the printing is completed.

In the present exemplary embodiment, the cartridge replacement log is described to be output by printing. However, the controller board 102 may display the same contents on a web browser when accessed by the PC 150 via the web browser. The controller board 102 may output the cartridge replacement log to the PC 150 as display data.

Figures 7A, 7B:
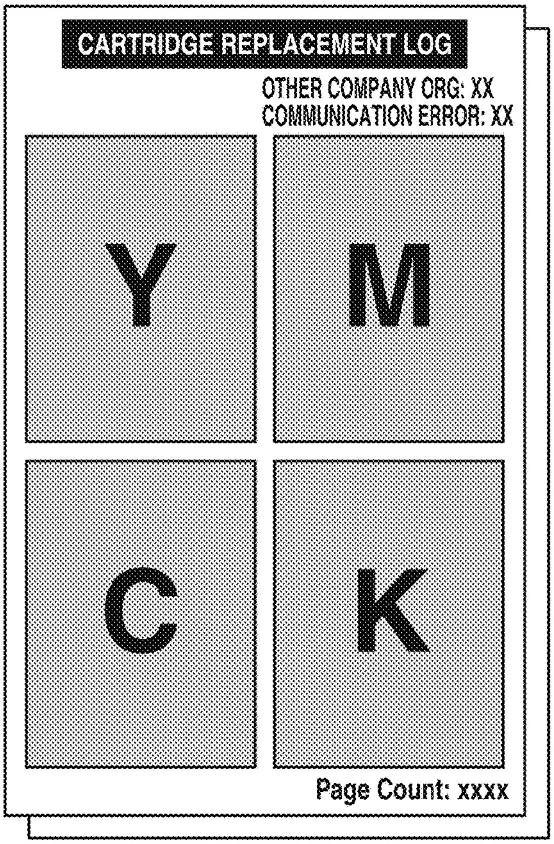
FIGS. 7A and 7B are diagrams illustrating a printed cartridge replacement log.

FIGS. 7A and 7B illustrate an example of the output cartridge replacement log. In FIG. 7A, a cartridge replacement log of four color toner cartridges of yellow (Y), magenta (M), cyan (C), and black (K), is printed. FIG. 7B illustrates an example of the printed contents, in which information similar to that of the cartridge replacement log described in FIG. 5 is included.

Figure 8:
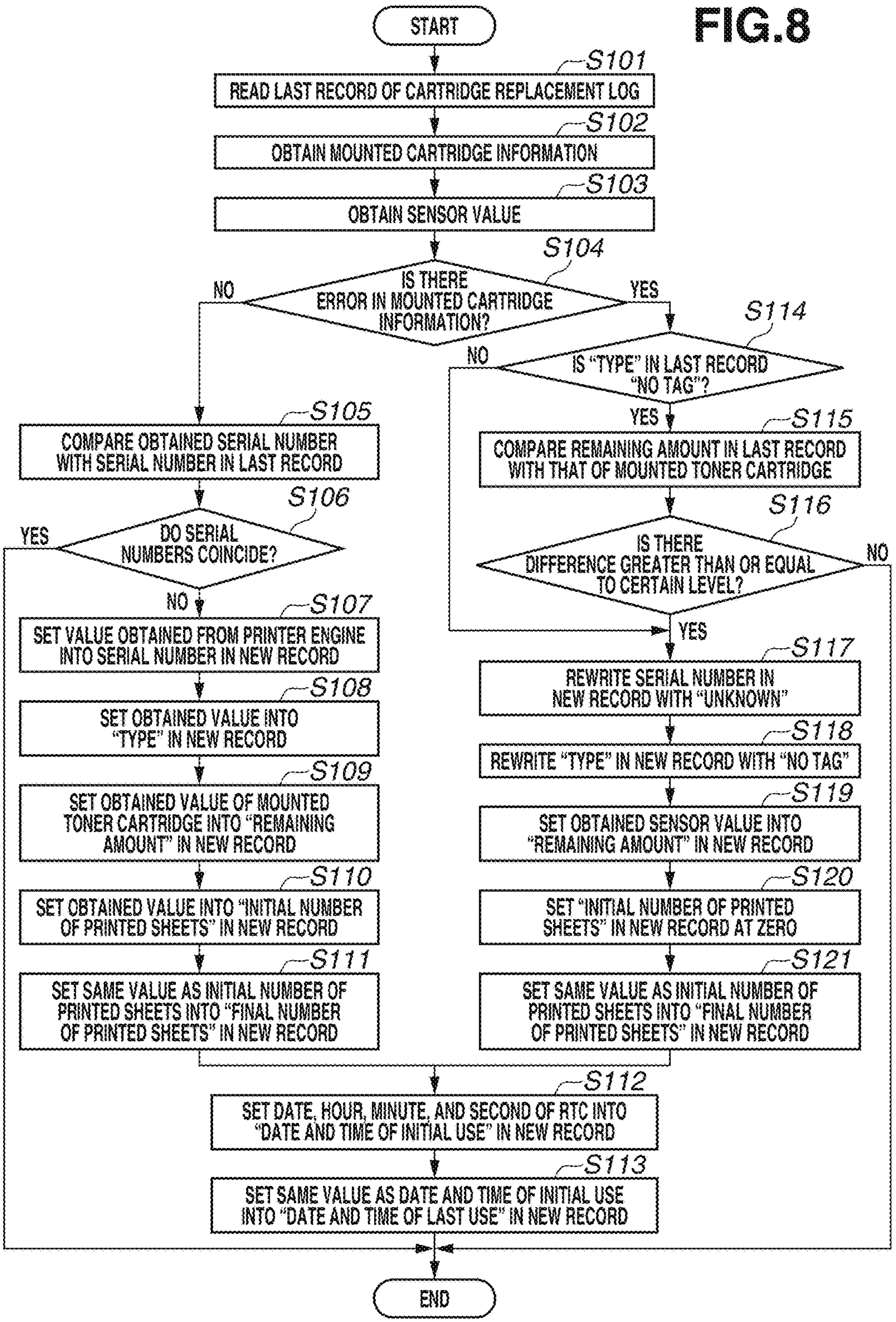
FIG. 8 is a flowchart illustrating a processing procedure for adding a record to a cartridge replacement log.

The controller board 102 updates the cartridge replacement log each time a toner cartridge is detected to be replaced. FIG. 8 illustrates a processing procedure example of the method for managing a toner cartridge (an example of a consumable management method), including processing for updating the cartridge replacement log described with reference to FIG. 5. This processing is executed by the controller board 102. While the color of the toner cartridge is not mentioned, similar processing is performed on each of the toner cartridges of yellow, magenta, cyan, and black.

The processing of FIG. 8 is started when the printer engine 105 is powered on or when a cover (not illustrated) of the image forming unit 303 is opened and closed. In other words, the processing is started if there is a possibility that a toner cartridge is replaced. As a precondition, processing for recording mounted cartridge information in the apparatus-side memory 203 has been performed before the printer engine 105 forms an image by using the toner cartridge. In step S101, the controller board 102 reads the cartridge replacement log. The controller board 102 here reads the last record of the cartridge replacement log. In step S102, the controller board 102 obtains the mounted cartridge information about the mounted toner cartridge from the memory tag 314 (314*a* to 314*d*) via the printer engine 105. In other words, the controller board 102 performs information reading. The obtained mounted cartridge information includes the serial number 401, the type 402, the number of printed sheets 403, and the remaining amount 404 illustrated in FIG. 4. In step S103, the controller board 102 obtains a sensor value of the toner remaining life sensor 315 (315*a* to 315*d*) which detects the remaining amount of toner in the mounted toner cartridge from the printer engine 105 via the device controller 224.

In step S104, the controller board 102 determines whether there is an error in the mounted cartridge information of step S102. In other words, the controller board 102 determines whether the information reading is successful. If there is no error (NO in step S104), the serial number is successfully obtained. In step S105, the controller board 102 compares the obtained serial number with the serial number in the last record of the cartridge replacement log. If the serial numbers coincide (YES in step S106), the controller board 102 determines that the toner cartridge has not been replaced, and the processing ends.

If the serial numbers do not coincide (NO in step S106), the controller board 102 detects that the toner cartridge has been replaced. In steps S107 to S113, the controller board 102 adds a new record to the cartridge replacement log. In steps S107 to S110, the controller board 102 records the serial number, the type, the remaining amount, and the number of printed sheets obtained in step S102 in the added record. In step S111, the controller board 102 sets the same value as the initial number of printed sheets into the final number of printed sheets. Since the number of printed sheets obtained from the printer engine 105 is set into the initial number of printed sheets in step S110, the value set into the final number of printed sheets is the same as the number of printed sheets obtained from the printer engine 105. In step S112, the controller board 102 sets a date, hour, minute, and second of a not-illustrated real-time clock (RTC) provided on the controller board 102 into the date and time of initial use. In step S113, the controller board 102 sets the same value as the date and time of initial use into the date and time of last use.

In step S104, if there is determined to be an error in the mounted cartridge information received in step S102 (YES in step S104), then in step S114, the controller board 102 determines that the reading of the mounted cartridge information is failed, and determines whether the type in the last record is "no tag." If the type is not "no tag" (NO in step S114), the controller board 102 determines that the mounted cartridge information recorded in the apparatus-side memory 203 is not information read from the toner cartridge. The processing proceeds to step S117 in order for the controller board 102 to additionally write a new record to the apparatus-side memory 203.

In step S114, if the type in the last record is "no tag" (YES in step S114), then in step S115, the controller board 102 compares the remaining amount recorded in the last record, i.e., the remaining amount last measured and recorded, with the sensor value obtained in step S103. In step S116, the controller board 102 determines whether there is a difference greater than or equal to a certain level therebetween. If there is a difference greater than or equal to a certain level (YES in step S116), the controller board 102 determines that the remaining amount is not information read from the toner cartridge before replacement. That is, the controller board 102 detects that the toner cartridge has been replaced. The processing proceeds to step S117.

A specific example of the comparison processing of step S115 will be described. For example, suppose that the remaining amount of toner in the last record of the apparatus-side memory 203 is 30%, and a threshold serving as the certain level of difference is 50%. Suppose also that the sensor value obtained in step S103 is 50%. In such a case, the controller board 102 determines that the same toner cartridge is mounted, since there is no difference greater than the threshold. On the other hand, if the sensor value obtained in step S103 is greater than or equal to 90%, there is a difference greater than the threshold. The controller board 102 thus determines that another toner cartridge refilled with toner is mounted.

The threshold may be determined in advance with respect to each image forming apparatus. The threshold may be dynamically determined based on variations of the sensor value during use of one cartridge.

In the present exemplary embodiment, the sensor value used for the determination is described by using the remaining amount of toner as an example. However, life detection units intended for the photosensitive drum and the developing unit may be provided aside from the toner remaining life sensor, and such sensor values may be used to determine a drum remaining life and a developing unit remaining life. In such a case, the drum remaining life and the developing unit remaining life are similarly recorded as a record in the apparatus-side memory 203 in the image forming apparatus 100. A method for determining the drum remaining life by using the number of rotations of the photosensitive drum is widely known. The drum remaining life determined by such a method is recorded as a record in the apparatus-side memory 203. A unit may be used, if there is a difference greater than or equal to a certain level from the drum remaining life obtained in step S103, for determining that the toner cartridge has been replaced.

When comparing the remaining amount stored in the last record and the sensor value obtained in step S103, the controller board 102 can make a determination based on combination of results of a plurality of sensor values. The reason is that in a case where only one sensor value is used as a reference and if another toner cartridge after replacement happens to exhibit the same sensor value with the sensor value obtained in step S103, the toner cartridge can be determined to not have been replaced. Taking the conditions of a plurality of sensor values into account can greatly reduce the frequency of occurrence of such a misjudgment.

In step S117, the controller board 102 rewrites the serial number in the new record with "unknown." In step S118, the controller board 102 rewrites the type with "no tag." In step S119, the controller board 102 sets the sensor value obtained in step S103 into the remaining amount. In step S120, the controller board 102 sets the initial number of printed sheets at zero. In step S121, the controller board 102 sets the final number of printed sheets at the initial amount of printed sheets (i.e., zero). In steps S112 and S113, the controller board 102 records the date and time of initial use and the date and time of last use in the same manner as described above.

Figure 9:
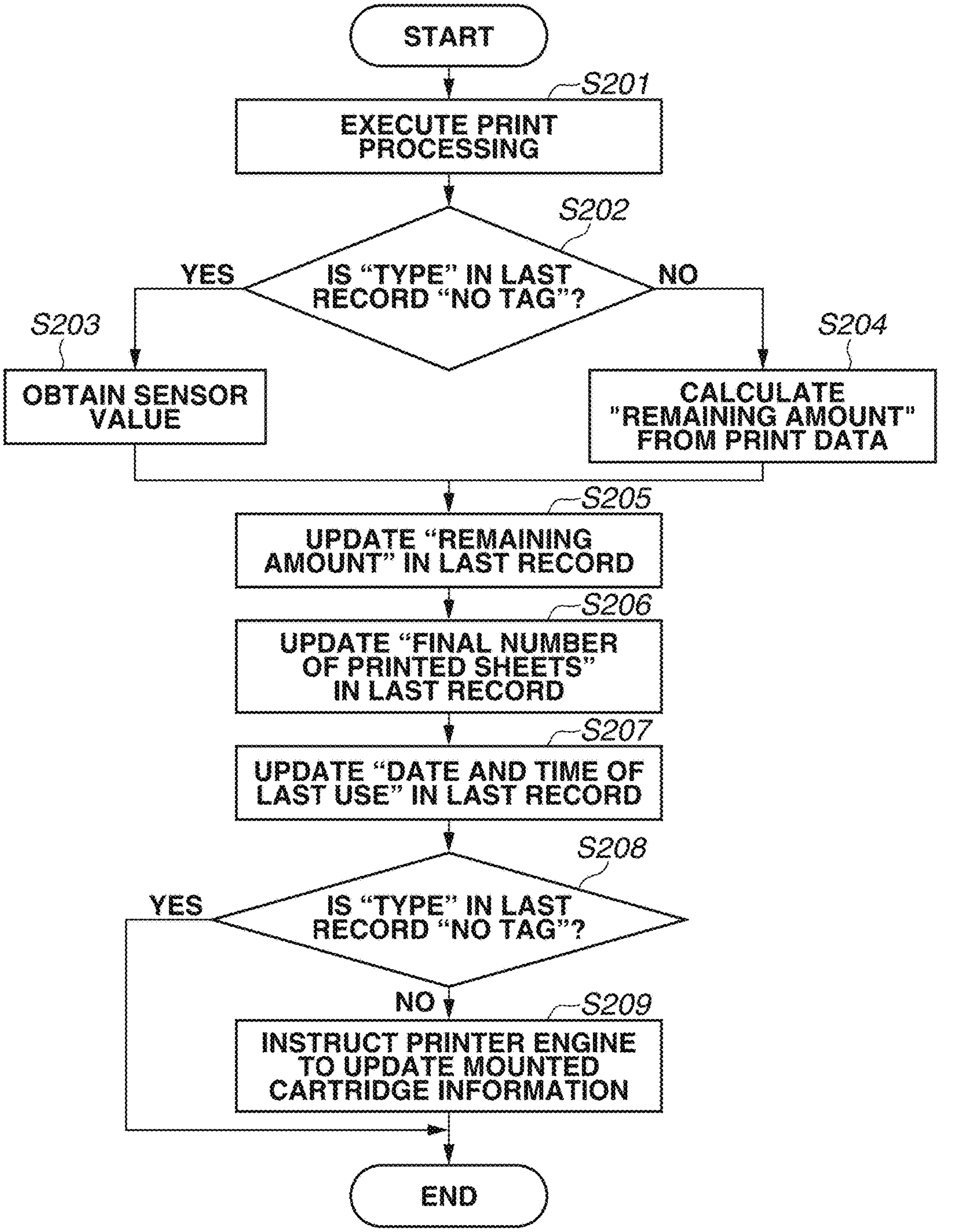
FIG. 9 is a flowchart illustrating a processing procedure for updating a record in executing printing.

FIG. 9 is a flowchart illustrating a processing procedure for updating a record in executing printing. The controller board 102 performs this processing each time a print instruction from the PC 150 is accepted. In step S201, the controller board 102 executes print processing to form an image. In step S202, the controller board 102 determines whether the type in the last record is "no tag." If the type is "no tag" (YES in step S202), then in step S203, the controller board 102 obtains the sensor value indicating the remaining amount of toner in the toner cartridge as in step S103. On the other hand, if the type is not "no tag" (NO in step S202), i.e., if the mounted cartridge information is normally obtained, then in step S204, the controller board 102 calculates the remaining amount. The "remaining amount" is obtained in a manner that, for example, the controller board 102 calculates toner consumption from the number of dots of the print data, and subtracts the calculated value from the previous "remaining amount" to determine the new "remaining amount".

In step S205, the controller board 102 updates the remaining amount in the last record with the sensor value obtained in step S203 or the "remaining amount" calculated in step S204. In step S206, the controller board 102 updates the final number of printed sheets. In step S207, the controller board 102 updates the date and time of last use. In step S208, the controller board 102 determines again whether the type in the last record is "no tag." If the type is "no tag" (YES in step S208), the processing ends. In step S208, if the type is not "no tag" (NO in step S208), then in step S209, the controller board 102 instructs the printer engine 105 to update the mounted cartridge information, that is, more specifically, to update the type, the number of printed sheets, and the remaining amount in the memory tags 314*a* to 314*d*, illustrated in FIG. 4, and the processing ends. The purpose of determining whether the type in the last record is "no tag" is to determine whether the update processing of the memory tags 314*a* to 314*d* can be performed. The controller board 102 may therefore obtain any of the records of the mounted cartridge information instead of the last record, and determine whether to perform the update processing of the memory tags 314*a* to 314*d* depending on whether the record is successfully obtained.

In the present exemplary embodiment, the update processing of the record and the memory tags 314*a* to 314*d* is described to be performed upon each print instruction. However, the frequency of the update processing may be reduced in view of printing performance. In the present exemplary embodiment, the image forming apparatus 100 is described to be an apparatus having a print function. However, the image forming apparatus 100 may be a digital multifunction peripheral having a scanner function and/or a facsimile (FAX) function as well.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-181578, filed Sep. 15, 2015, which is hereby incorporated by reference herein in its entirety.

What is claimed is:

1. An image forming apparatus that is able to print using recording material stored in a consumable container and is able to read one or more information stored in a memory tag attached to the consumable container, the image forming apparatus comprising:

at least one processor and at least one memory coupled to the at least one processor that stores instructions and, upon execution of the instructions by the at least one processor controls the at least one processor to act as:

a storage;

a reading unit configured to read a number of sheets of recording material printed using the recording material stored in the consumable container from the memory tag attached to the consumable container, and a storage control unit configured to store, in the storage, the number of sheets read by the reading unit as the number of sheets printed using the recording material stored in the consumable container and a number of sheets of recording material printed using recording material stored in another consumable container, wherein a memory tag for storing the number of sheets printed using the recording material stored in the another consumable container is not attached to the another consumable container.

2. The image forming apparatus according to claim 1, wherein the storage control unit sets, in a case where the another consumable container not having the memory tag attached thereto is mounted on the image forming apparatus immediately after the consumable container having the memory attached thereto has been mounted on the image forming apparatus, a new record about the another consumable container.

3. The image forming apparatus according to claim 2, wherein the new record includes the number of sheets of recording material printed using the recording material stored in the another consumable container.

4. The image forming apparatus according to claim 1, wherein the at least one processor and the at least one memory further act as a measurement unit configured to measure a degree of recording material stored in the consumable container, wherein the storage control unit stores, if the another consumable container not having the memory tag attached thereto is mounted on the image forming apparatus immediately after the consumable container not having the memory attached thereto has been mounted on the image forming apparatus and if there is a difference greater than or equal to a predetermined level between a degree of recording material stored in the consumable container measured by the measurement unit and a degree of recording material stored in the another consumable container, the new record about the another consumable container.

5. The image forming apparatus according to claim 2, wherein the storage control unit sets an initial value to the new record as the number of sheets of recording material printed using the recording material stored in the another consumable container.

6. The image forming apparatus according to claim 4, wherein the consumable container stores the degree of recording material stored in the other storing unit in the new record.

7. The image forming apparatus according to claim 6, wherein the measurement unit measures a degree of recording material stored in the consumable container based on a sensing result of a sensor.

8. The image forming apparatus according to claim 7, wherein the storage control unit updates the degree of recording material stored in the another consumable container each time the image formation is performed.

9. The image forming apparatus according to claim 1, further comprising an output unit configured to output the number of sheets of recording material printed using the recording material stored in the another consumable container in the storage of the image forming apparatus.

10. A consumable management method by an image forming apparatus that is able to print using recording material stored in a consumable container and is able to read one or more information stored in a memory tag attached to the consumable container, comprising:

reading a number of sheets of recording material printed using the recording material stored in the consumable container from the memory tag attached to the consumable container storing, in a storage, the number of sheets read by the reading unit as the number of sheets printed using the recording material stored in the consumable container and a number of sheets of recording material printed using recording material stored in another consumable container, wherein a memory tag for storing the number of sheets printed using the recording material stored in the another consumable container is not attached to the another consumable container.

11. A non-transitory computer readable storage medium storing a program for causing an image forming apparatus that is able to print using recording material stored in a consumable container and is able to read one or more information stored in a memory tag attached to the consumable container to execute a consumable management method comprising:

reading a number of sheets of recording material printed using the recording material stored in the consumable container from the memory tag attached to the consumable container storing, in a storage, the number of sheets read by the reading unit as the number of sheets printed using the recording material stored in the consumable container and a number of sheets of recording material printed using recording material stored in another consumable container, wherein a memory tag for storing the number of sheets printed using the recording material stored in the another consumable container is not attached to the another consumable container.

* * * * *